Patented Jan. 18, 1927.

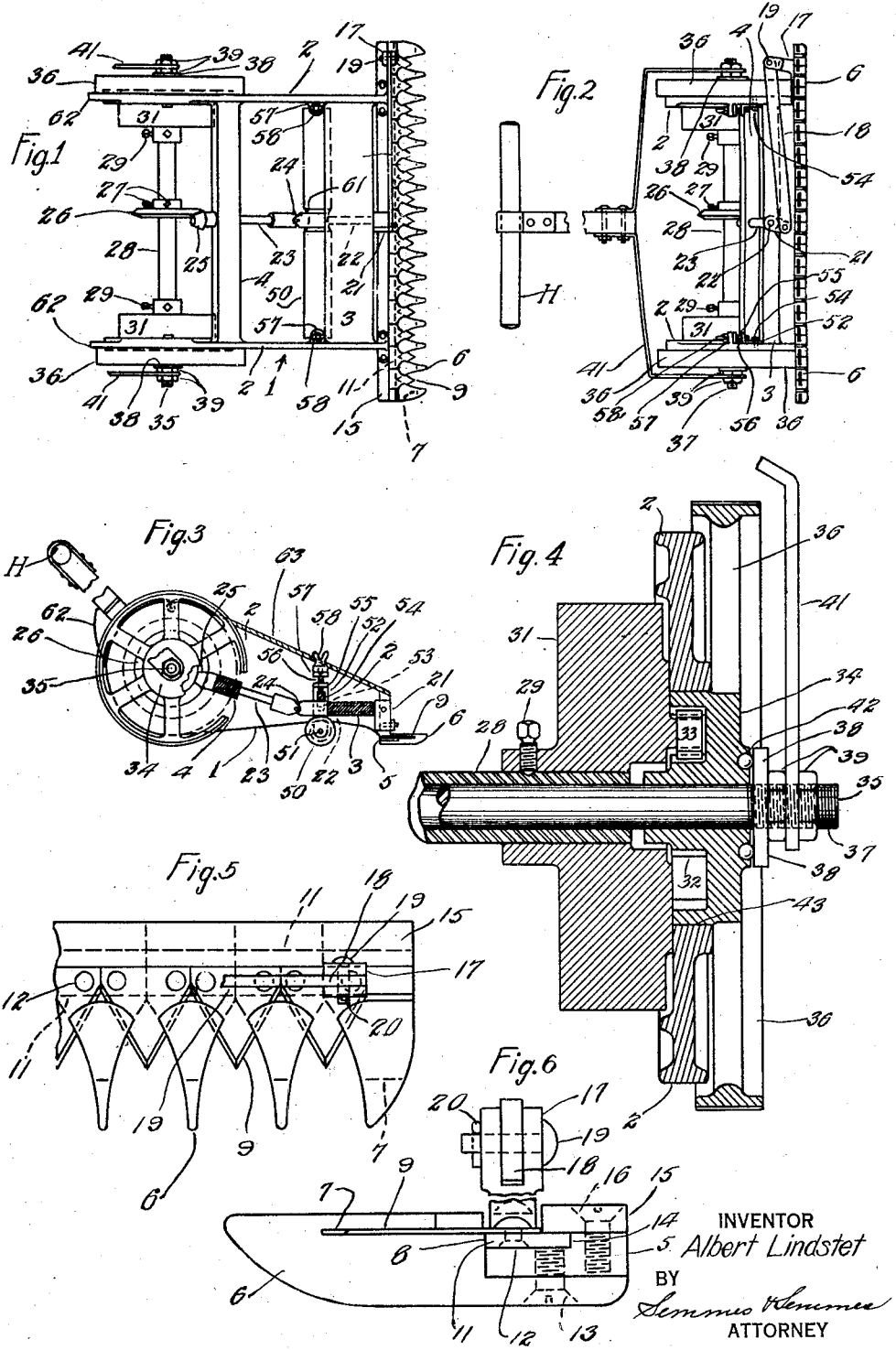

1,615,126

UNITED STATES PATENT OFFICE.

ALBERT LINDSTET, OF BRONXVILLE, NEW YORK.

LAWN MOWER.

Application filed April 10, 1924. Serial No. 705,581.

My invention relates to mowing machinery, and more particularly to lawn mowers.

Heretofore in mowing lawns, it has been difficult to cut grass up to a wall or the base of a tree, and also under bushes. Moreover, in cases where rocks or twigs became entangled in the cutting blades, by reason of the type of drive connection used, the blades were subjected to heavy strain and possible injury. It was to rectify these and other disadvantages in the prior art devices that this invention was conceived.

An object of my invention is to provide a lawn mower which is noiseless in operation, which has few parts to repair or replace, and which is moreover sturdy in construction.

Another object of my invention is to provide a lawn mower that will cut grass up to the base of a wall or the base of a tree, or will cut grass readily under bushes or shrubbery.

A further object of my invention is to provide a drive mechanism for lawn mowers in which a coupling between the source of power and the mechanism for operating the cutting teeth is capable of slippage to prevent undue strain on the cutting teeth should they become clogged.

A still further object of my invention is to provide means for readily demounting the cutter bar and removing the cutter teeth for repair or replacement.

In the drawings:

Figure 1 is a top plan view of my lawn mower;

Fig. 2 is a view in front elevation of my lawn mower;

Fig. 3 is a side elevational view of my device, part of the mechanism being shown in cross section;

Fig. 4 is a cross sectional view taken through the axle of the drive wheels;

Fig. 5 is a detail top plan view of the cutter bar and the mounting therefor;

Fig. 6 is a detail view in side elevation of the cutter bar and mounting therefor.

Referring to the drawings for a detailed description, the framework of the machine, which I have indicated by the numeral 1, comprises side supports 2 united by a transverse bar 3 and a transverse bar 4. The transverse bars 3 and 4 may be integrally cast with the side pieces, or may be attached thereto in any suitable manner. At the front end of the side pieces 2 is suitably bolted, or integrally formed, a transverse finger bar 5. The finger bar 5 has bolted to it fingers or teeth 6. Each tooth 6 is provided with a slot 7 and a shoulder 8 adapted to abut against the front edge of the finger bar 5. The teeth 6 are arranged in a row, and guide the grass between them against reciprocating cutter teeth 9 which travel in the slots 7 and are carried by a cutter bar 11. The angular cutter teeth 9 are held to the cutter bar by means of bolts or rivets 12. The teeth 6 are held to the finger bar 5 by means of bolts 13. Overlying the cutter bar 11, which lies flush with a shoulder 14 formed on the finger bar 5, is a retaining bar 15 held by means of screws 16 tightly against the finger bar 5.

The cutter bar may be removed to repair the cutter teeth 9 by undoing the screws 16 and removing the retaining bar 15, or by undoing the screws 13 and removing the guide teeth 6.

The cutter bar 11 has attached thereto an upstanding lug 17 which is bifurcated. The bifurcated lug 17 has within its split end the end of a link 18, which is pivotally held in place by means of a bolt 19 that is prevented from slipping out of place by a cotter pin 20.

The link 18 is pivotally attached at its other end to a crank 21 mounted on a shaft 22 that is journaled in the transverse bar 3. The shaft 22 is coupled to a shaft 23 by a universal coupling 24. At its end the shaft 23 carries a beveled friction head 25 and is journaled in the transverse bar 4.

The friction head 25 is adapted to contact with a beveled disk 26 attached by means of screws 27 to a hollow shaft 28. Attached to the hollow shaft 28 at each end, by means of screws 29, are fly wheels 31. The fly wheels 31 carry pawls 33 which are adapted to cooperate with ratchets 32 on the inside of hubs 34 and extending through the hubs 34 adapted to rotate with them is a shaft 35. Mounted on the outside of the hubs 34 are wheels 36 upon which the mower is adapted to run.

The shaft 35 is screw-threaded at 37. Over the screw-threaded end 37 is fitted a retaining washer 38. Nuts 39 hold the retaining washer 38 in place. Between the nuts 39 are the ends of a yoke 41 to which the handle H, adapted to push the mower, is attached. The retaining washer 38 contacts with balls 42 which permit the hubs 34 to turn freely. In order to permit free rotation of the hubs 34, they are journaled in the side pieces 2, as indicated at 43.

By reason of the pawl and ratchet mechanism, the fly wheels 31 and the hollow shaft 28 are revolved to operate the cutter mechanism in the forward direction only of the mower. In the forward direction of the mower, the rotation of the wheels is imparted through the ratchet 32 on each hub 34, through pawls 33 to the fly wheels 31. The beveled disk 26 is rotated to rotate the conical friction head 25, thus causing the shaft 22 to rotate. Through connection with crank 21, the link 18 is given a motion of reciprocation that is imparted to the cutter bar. The cutter teeth are caused to shuttle back and forth in the open spaces 7 between the teeth 6 and the grass is cut.

In order to regulate the height at which the mower will operate, I have provided a roller 50 journaled on a shaft 51 which is mounted on adjustable brackets 52. The brackets 52 are provided with slots 53 therein fitting over screws 54 screwed into the side pieces 2 of the framework. The brackets 52 are provided with overhanging laterally projecting lips 55 at their tops, through which are screwed screws 56. The screws 56 pass through smooth bored apertures provided in outstanding lugs 57 attached to the side pieces 2, and preferably integrally formed therewith. Winged heads 58 for the screws 56 permit the screws 56 to be rotated to adjust the height of the support brackets 52. The height of the brackets having once been adjusted, tightening of screws 54 will hold the brackets in position. The roller 50 is provided with a groove 61 therein which permits the roller 50 to be adjusted upwardly for a considerable distance without encountering the shaft 22 or the universal joint 24.

The side pieces 2 are provided with outstanding lugs 62 which are adapted to act as stop means for the yoke 41 to prevent the handle from falling onto the ground. A cover 63 may be provided to extend over the side pieces of the operating mechanism, as indicated in Fig. 3.

It is obvious that my lawn mower may be run by hand power or by gasoline, or any other suitable source of power. Because the source of power is located back of the cutter bar, and the cutter bar and finger bar extend out beyond the front of the machine, the machine may be easily used to cut grass around trees and up to the base of walls, as well as under shrubbery. The friction drive permits slippage should an obstacle become wedged in the cutter bar, thus preventing grave injury to the cutting blades in such contingencies. By reason of the fact that the mechanism for holding the cutter bar in place is readily detachable, blades may be easily removed to permit of either repair or replacement.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:—

1. A lawn mower comprising traction wheels mounted upon an axle, a frame having side supports journaled upon the hubs of the traction wheels, a reciprocating blade mounted upon the supports, a supporting roller having a groove therein carried by the side supports, a power shaft adapted to turn in said groove without touching the supporting roller, means connecting with the shaft to reciprocate the blade, and power means to rotate the shaft.

2. A lawn mower comprising traction wheels mounted on an axle, a frame having side supports journaled upon the hubs of the traction wheels, a reciprocating blade mounted upon the supports, a support roller having a groove therein carried by the side supports, a power shaft adapted to turn in said groove without touching the support roller, a flexible coupling in said shaft, means connecting with the shaft to reciprocate the blade, and power means to rotate the shaft.

3. In a lawn mower, a drive mechanism comprising an axle, traction wheels mounted to revolve upon the axle, a tubular shaft encasing the axle between the traction wheels, a fly wheel mounted upon each end of the tubular shaft in juxtaposition to the hubs of the traction wheels, a ratchet and pawl connection between the fly wheels and the hubs of the traction wheels, and a frictional disk keyed upon the tubular shaft.

4. In a lawn mower, a drive mechanism comprising an axle, corresponding traction wheels mounted upon the respective ends of the axle, a tubular shaft encasing the axle between the traction wheels, fly wheels mounted adjustably upon the ends of the tubular shaft, pawls carried by the fly wheels, ratchets in the hubs of the traction wheels in engagement with the pawls carried by the fly wheels, and a beveled frictional disk keyed upon the tubular shaft.

5. A lawn mower comprising traction wheels mounted on a shaft, a frame having side supports journaled upon the hubs of the traction wheels, a reciprocating blade mounted upon the side supports, a beveled disk, means for rotating the disk, a shaft, a beveled friction head on the shaft contacting with the beveled disk, and means connecting with the shaft to reciprocate the blade.

6. A lawn mower comprising traction wheels mounted on a shaft, a frame having side supports journaled upon the hubs of the traction wheels, a reciprocating blade mounted upon the side supports, a beveled disk, means for rotating the disk, a two part shaft having a flexible coupling, a beveled friction head on the shaft contacting with the beveled disk, and means connecting with the shaft to reciprocate the blade.

7. A lawn mower comprising traction wheels mounted on a shaft, a frame having side supports journaled on the hubs of the traction wheels, a reciprocating blade mounted upon the side supports, a support roller having a groove therein carried by the side supports, a shaft adapted to turn in said groove without touching the support roller, a flexible coupling in said shaft, a beveled disk, means for rotating the disk, a beveled friction head on the shaft in engagement with the beveled disk, and means connecting with the shaft to reciprocate the blade.

8. A lawn mower comprising traction wheels mounted upon an axle, a tubular shaft incasing the axle between the traction wheels, fly wheels mounted upon the ends of the tubular shaft, ratchet and pawl connections between the fly wheels and the hubs of the traction wheels, a frame journaled at one end upon the hubs of the traction wheels, a finger bar and a reciprocating blade mounted upon the other end of the frame, and a driving connection between the tubular shaft and the reciprocating blade.

9. A lawn mower comprising an axle, traction wheels mounted to revolve upon the axle, a tubular shaft mounted to revolve upon and encase the axle between the traction wheels, fly wheels locked upon the ends of the tubular shaft, pawls carried by the fly wheels, ratchets in the hubs of the traction wheels in engagement with the pawls carried by the fly wheels, a frame journaled at one end upon the hubs of the traction wheels, a cutting mechanism mounted upon the other end of the frame, a driving connection between the tubular shaft and the cutting mechanism and a handle journaled upon the axle.

10. In a lawn mower, an axle, traction wheels mounted upon the axle, a frame journaled upon the hubs of the traction wheels, a tubular shaft enclosing the axle between the hubs of the traction wheels, fly wheels adjustably mounted upon the ends of the tubular shaft in juxtaposition to the hubs of the traction wheels and bearing against the frame and a pawl and ratchet connection between the fly wheels and the hubs of the traction wheel.

11. In a lawn mower, an axle, corresponding traction wheels mounted to revolve upon the axle, a tubular shaft encasing the axle between the hubs of the traction wheels, a frame journaled upon the hubs of the traction wheels in close relation to the spokes of said wheels, fly wheels adjustably mounted upon the ends of the tubular shaft in close relation to the frame and the hubs of the traction wheels, ratchets in the hubs of the traction wheels, pawls upon the fly wheels in engagement with the ratchets in the hubs and a beveled disk keyed upon the tubular shaft.

12. A lawn mower comprising an axle, traction wheels mounted to revolve upon the axle, a tubular shaft encasing the axle between the hubs of the traction wheels, fly wheels adjustably mounted upon the ends of the tubular shaft, the fly wheels bearing against the hubs, a pawl and ratchet connection between the fly wheels and the hubs, a beveled disk keyed upon the shaft, a frame journaled on the hub of the traction wheels between the spokes of the traction wheels and the fly wheels, a reciprocating blade mounted upon the free end of the frame, and a driving connection between the beveled disk and the reciprocating blade.

In testimony whereof I affix my signature.

ALBERT LINDSTET.